(12) United States Patent
Yoshida

(10) Patent No.: US 6,885,475 B1
(45) Date of Patent: Apr. 26, 2005

(54) NAME CARD CREATING APPARATUS

(75) Inventor: Masato Yoshida, Kyoto (JP)

(73) Assignee: Omron Corporation (JP)

( * ) Notice: Subject to any disclaimer, the term of this patent is extended or adjusted under 35 U.S.C. 154(b) by 802 days.

(21) Appl. No.: 09/632,089

(22) Filed: Aug. 2, 2000

(30) Foreign Application Priority Data

Aug. 6, 1999 (JP) .......................................... 11-224095

(51) Int. Cl.⁷ .............................................. H04N 1/40
(52) U.S. Cl. ...................................... 358/1.9; 358/448
(58) Field of Search ................. 358/1.9, 448; 503/227; 395/326; 707/506

(56) References Cited

U.S. PATENT DOCUMENTS 5,336,657 A * 8/1994 Egashira et al. ............ 503/227
5,617,528 A * 4/1997 Stechmann et al. ......... 715/517
5,930,810 A * 7/1999 Farros et al. ............... 715/506

FOREIGN PATENT DOCUMENTS

| JP | 6-289584 | 10/1984 |
| JP | 2-11394 | 1/1990 |
| JP | 3-19857 | 1/1991 |
| JP | 02-251150 | 4/1992 |
| JP | 5-63178 | 8/1993 |
| JP | 10-257296 | 9/1998 |
| JP | 09-306462 | 4/1999 |

* cited by examiner

Primary Examiner—Thomas D Lee
Assistant Examiner—Stephen Brinich
(74) Attorney, Agent, or Firm—Dickstein Shapiro Morin Oshinsky LLP

(57) ABSTRACT

When the printing pattern of an existent name card is read by a name card reading section, the image of the name card generated by the reading process is displayed on a display section. Next, an operator photographs the face of a name card user through an image pick-up section and allocates the image of the face thus obtained to the blank space region of the name card on the display screen. When the allocating process is completed, a predetermined number of name cards are sequentially delivered into a coating section and a printing section so that a coating process on the surface of the name card and a process of printing a face photograph in the allocated blank space region are carried out.

20 Claims, 7 Drawing Sheets

ABC CORPORATION

SALES DEPARTMENT
THIRD SALES DIVISION      ICHIRO YAMAMOTO

XXXXXXXXXX
          XXXXXXXXXX

ABC CORPORATION

SALES DEPARTMENT
THIRD SALES DIVISION      ICHIRO YAMAMOTO

XXXXXXXXXX
          XXXXXXXXXX

NAME CARD CREATING APPARATUS

BACKGROUND OF THE INVENTION

1. Field of the Invention

The present invention relates to an apparatus for creating a name card using a computer.

2. Description of the Related Art

In many companies, name cards having unified formats have been used in divisions and departments. In most cases, a request for creating this kind of name cards is given to printing offices. Therefore, one or several hundred name cards are usually created for each employee at a time and are then distributed.

In recent years, a software package for creating a name card has been put on the market. Also in a personal computer, it is possible to easily create a desirable number of name cards. In companies having a small number of people, such software is used to create a desirable number of name cards for each person. Moreover, some stationary shops in the town carry out name card creating services using such a software, and people are increasingly using/creating name cards for the purpose of business or other purposes.

In recent years, name cards having photographs have particularly been employed in companies or departments for sales. It has been reported that the effects can be increased in respect of sales strategy, for example, the name cards having photographs can enhance the degree of appeal for clients and the impression of a person in charge.

However, the name cards having photographs require much higher printing cost than normal name cards. For this reason, when the name card for each person is created in the printing office, the cost is considerably increased. Also if the package software for creating the name cards is used, it takes a long time to carry out a work for allocating various information and face photographs. Therefore, it is hard to create name cards for a large number of people.

In order to solve the problem, there has been a method of putting face photograph stickers created by an automatic vending machine for face photograph stickers on a blank space of an existent name card. This method is convenient in that the existent name card and the name card having a face photograph can be used separately depending on the clients. However, it is necessary to put the stickers one by one. Therefore, the creation takes a great deal of time and labor. Moreover, the name card having the sticker gives a sense of incompatibility to other people or the stickers coming off from the name card give ugliness.

In a conventional method of creating a large number of name cards in a defined format at a time, furthermore, the same problem arises as in the face photographs also when it is necessary to add new information.

For example, in the case in which it is necessary to newly make a logo for companies, name cards for all people should conventionally be printed again. Consequently, the cost is considerably increased. Moreover, also in the case in which information about catch copy or names of products are to be printed for use for a particular period as in a name card in exhibitions, there has conventionally been a method of putting stickers on the existent name cards. Furthermore, when name cards having new information added thereto are required, for example, untitled people are promoted or an address for an electronic mail is acquired, new name cards are printed again without utilizing the conventional name cards. Consequently, the cost is increased.

SUMMARY OF THE INVENTION

In consideration of the problem, it is an object of the invention to print additional information such as face photographs in the blank region of the existent name card, thereby easily creating a name card depending on various uses at a low cost by utilizing the existent name.

Moreover, the invention has another object to fetch, from the outside, a data file storing basic information such as the name of companies, names and addresses and layout information for allocating these information to a paper having the same size as that of the name card and to then carry out printing with images such as face photographs allocated to a blank space region in the layout, thereby utilizing this kind of name card creating service to reduce a labor and cost taken for the creation of names having photographs or marks.

A first aspect of the invention is directed to a name card creator comprising reading means for fetching a name card having predetermined information printed thereon and reading a layout thereof, display means for displaying the layout of the name card read by the reading means, input means for inputting predetermined additional information, information allocating means for allocating the additional information input through the input means to a predetermined blank space region in the layout depending on an external allocating operation for the layout displayed on the display means, and printing means for sequentially executing a process of printing the additional information in the blank space region allocated by the image allocating means for a predetermined number of name cards having information printed based on the layout.

A second aspect of the invention is directed to a name card creator comprising the same reading means and display means as those in the first aspect of the invention, image acquiring means for acquiring a predetermined image, image allocating means for allocating the image acquired by the image acquiring means to a predetermined blank space region in the layout depending on an external allocating operation for the layout displayed on the display means, and printing means for sequentially executing a process of printing the image in the blank space region allocated by the image allocating means for a predetermined number of name cards having information printed based on the layout.

A third aspect of the invention is directed to a name card creator comprising input means for externally fetching a data file storing a plurality of information to be described on a name card and information related to a layout for printing these information on a paper having the same size as that of the name card, display means for displaying the layout based on the data file fetched by the input means, image acquiring means for acquiring a predetermined image, image allocating means for allocating the image acquired by the image acquiring means to a predetermined blank space region in the layout depending on an external allocating operation for the layout displayed on the display means, and printing means for sequentially executing a process of printing information of the data file based on the layout and a process of printing the image in a blank space region allocated by the image allocating means for a predetermined number of papers having the same size as that of the name card.

A fourth aspect of the invention is directed to a name card creator according to the second or third aspect of the invention, wherein an image for a face photograph is acquired through the image acquiring means.

A fifth aspect of the invention is directed to a name card creator according to the second or third aspect of the invention, wherein the image acquiring means is constituted by a camera or an image scanner. On the other hand, a sixth aspect of the invention is directed to a name card creator, wherein the image acquiring means is constituted by means for acquiring an image created by a computer depending on a plotting operation.

A seventh aspect of the invention is directed to a name card creator according to any of the first to third aspects of the invention, further comprising coating means for carrying out a predetermined coating process on a print surface prior to the printing process to be executed by the printing means.

An eighth aspect of the invention is directed to a name card creator according to any of the first to third aspects of the invention, further comprising notifying means for giving a notice that the printing process of the printing means is completed.

A ninth aspect of the invention is directed to a name card creator according to any of the first to third aspects of the invention, further comprising calculating means for calculating an amount of money corresponding to the number of name cards printed by the printing means; and slip issuing means for issuing a slip on which the amount of money calculated by the calculating means is described.

According to the first aspect of the invention, the layout of the existent name card is read by the reading means, while the information to be added to the name card is input by the input means. When the layout of the name card is displayed on the display means, the input additional information is allocated to the predetermined blank space region depending on the allocating operation of the operator. Then, the process of the printing means is sequentially carried out for the predetermined number of existent name cards and the additional information is printed in the blank space region allocated on the name card.

According to the second aspect of the invention, the layout of the existent name card is read and displayed in the same manner as that in the first aspect of the invention and the image acquired by the image acquiring means is allocated to the blank space region depending on the allocating operation of the operator. Then, the printing process is sequentially carried out for the predetermined number of existent name cards and the image is printed in the blank space region allocated on the name card.

According to the third aspect of the invention, for example, in the case in which a name card creating service is utilized to create a name card having an image such as a face photograph printed thereon, basic information described on the name card such as a name, the name of a company, an address and a telephone number and layout information for printing these information on a paper having the same size as that of the name card are created in advance by a user and are filed. A service provider fetches the information of the data file created on the user side to the name creator and displays the layout on the display means, and acquires the image such as a face photograph through the image acquiring means. When the image is allocated to the predetermined blank space region in the layout by the image acquiring means through the allocating operation, the printing process is sequentially carried out for the predetermined number of papers having the same size as that of the name card and various information are printed on each paper based on the layout, and the image is printed in the allocated blank space region.

According to the fourth aspect of the invention, after the image of the face photograph of a person described on the name card by the image acquiring means is required and the face photograph is then printed in the blank space region of the name card.

According to the fifth aspect of the invention, an image to be put on the name card in addition to the basic information, for example, a face photograph or portrait of a person which is described on the name card or the logo of a company is generated through a camera or an image sensor and is printed in the blank space region of each name card.

According to the sixth aspect of the invention, the image such as a portrait or a mark which is created by a computer according to the plotting operation is printed in the blank space region of each name card.

According to the seventh aspect of the invention, the coating process is carried out on the print surface prior to the printing process. Therefore, any material can be used for a paper to make the print surface uniform.

According to the eighth aspect of the invention, when the printing process is completed, the notifying means is operated to give a notice that the process is completed.

According to the ninth aspect of the invention, in the case in which the name card creating service is to be carried out, the amount of money corresponding to the number of the printed name cards is automatically calculated and a slip such as a bill or a receipt is issued.

PREFERRED EMBODIMENTS OF THE INVENTION

Preferred embodiments of the present invention will be described as follows referring to the accompanying drawings.

Figure 1:
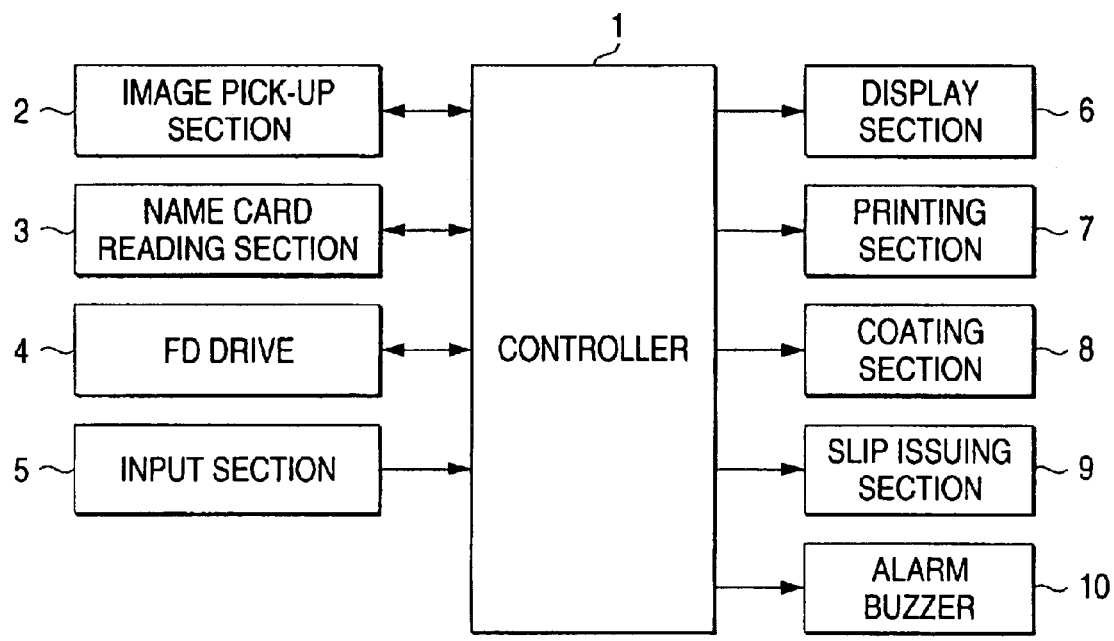
FIG. 1 is a block diagram showing the structure of a name card creator according to an embodiment of the invention.

FIG. 1 shows the structure of a name card creator according to an embodiment of the invention.

The name card creator is put on sale at the store of a dealer for a name card creating service and serves to carry out a service for printing photographs of faces in the blank space of an existent name card and for printing a name card having a face photograph by using data in a floppy disc brought by a customer.

The name card creator is constituted by a controller 1 (a computer) to which input/output sections such as an image pick-up section 2, a name card reading section 3, a floppy disc drive 4 (which will be hereinafter referred to as an "FD drive 4"), an input section 5, a display section 6, a printing section 7, a coating section 8, a slip issuing section 9 and an alarm buzzer 10 are connected.

The image pick-up section 2 is a digital camera including a CCD image pick-up element which serves to pick-up the image of the face of a user having a created name card from the front part and to generate static image data of a digital value. The name card reading section 3 serves to read a printing pattern on the name card brought by the customer and is constituted by an image scanner.

The FD drive 4 serves to read the contents of data with a floppy disc recording a data file for name card creation (hereinafter referred to as a "name card creating file") provided thereon.

The input section 5 is used for various operations for setting the number of name cards to be printed and a work for allocating the image of a customer's face obtained by the image pick-up section 2, and is constituted by a keyboard, a mouse and other operation keys.

The display section 6 is a display device such as a CRT or a liquid crystal panel, and serves to display the layout of a printing pattern read by the name card reading section 3 or the contents of data of the name card creating file read from the FD drive 4 under the control of the controller 1. An operator executes a work for allocating the image of a face obtained by the image pick-up section 2 to a predetermined blank space region on the name card by means of the input section 5 by referring to a display screen.

The printing section 7 is constituted by a thermal transfer printer capable of carrying out color printing, for example. In the case in which a face photograph is added to an existent name card, a plurality of name cards to be printed are sequentially fed to the printing section 7 and the image of the face is printed in blank space regions on papers which are allocated by the allocating work, respectively. Moreover, in the case in which a name card is to be printed by using the name card creating file read through the FD drive 4, a predetermined number of papers having the same size as that of the name card are sequentially fed to the printing section 7 and each information stored in the name card creating file and the image of the face thus allocated are printed.

The coating section 8 is provided in the previous stage of the printing section 7 and serves to carry out a coating process using a film transfer method on the surface of a name card obtained immediately before the supply to the printing section 7. More specifically, a tape-shaped transparent film having an adhesive surface is subjected to a heating and pressing process from above a film with the adhesive surface abutting on the print surface. Consequently, the film comes in close contact with the print surface so that a coating layer is formed.

The coating process has an object to flatten the paper surface, thereby preventing uneven printing and preventing bleeding of an ink due to the printing. A material depending on the type of the ink to be used in the printing section 7 is utilized for the film. For example, in the case in which a water-color ink is used, a film layer of such a type as to be microporous to absorb water during curing is utilized.

In order to automate the process of coating and printing a name card, the coating section 8 and the printing section 7 should be provided on a delivery path (not shown) of the name card in order and the control section should carry out adjustment to interlock the operations of the coating section 8 and the printing section 7. With such a structure, also in the case in which a large number of name cards are to be printed, the operator carries out only the process of allocating an image while referring to the display screen. Consequently, it is possible to considerably reduce a labor and time required for the process of creating a name card.

The alarm buzzer 10 serves to give the operator a notice that the name card set in the apparatus is completely printed. The slip issuing section 9 serves to issue a bill or receipt noting the expenses for creating a name card, and receives an amount of money corresponding to the number of the name cards printed by the controller 1 and issues a slip having the amount of money printed in a predetermined form.

The detailed procedure for the process of creating a name card using the name card creator will be described below.

Figure 2:
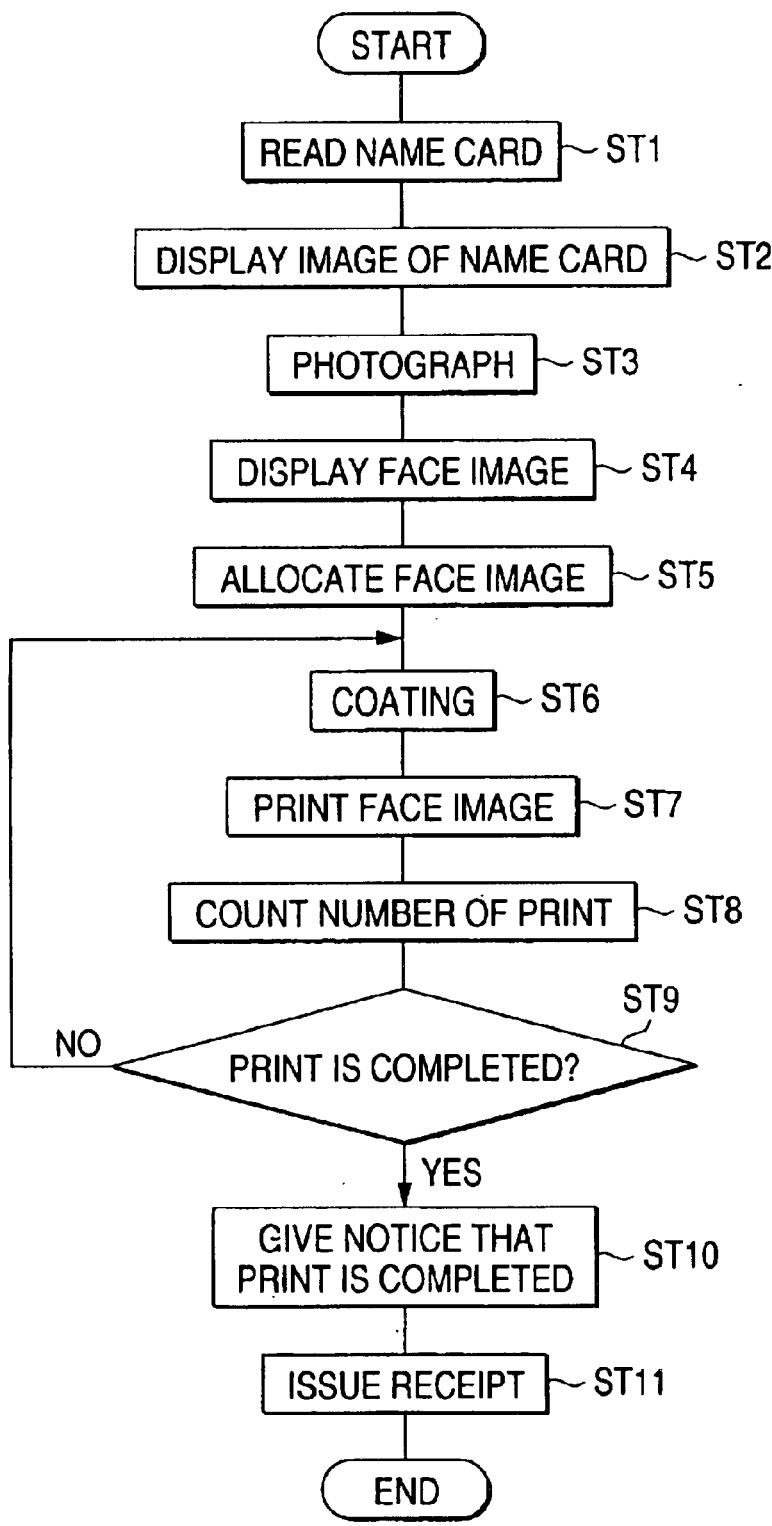
FIG. 2 is a flow chart showing the procedure for creating a name card having a face photograph based on an existent name card.

FIG. 2 shows the procedure for a process to be carried out when a face photograph is added to the blank space of the existent name card (a process for each step is indicated as "ST" in the drawing).

Prior to the process, one name card to be printed is set to the name card reading section 3 and the residual name cards are set to an inlet port connected to a delivery path for name cards (not shown). The operator sets the number of name cards to be printed in this state and then carries out a start operation. By the start operation, the reading process of the name card reading section 3 is carried out so that image data indicative of information printed on the name card and a printing pattern thereof (the position of arrangement of each information, the size of characters and a font) are generated (ST1).

Figures 3, 4:
FIG. 3 is a view illustrating an example of a name card to be printed.
FIG. 4 is a view illustrating a result obtained by printing a face photograph on the name card.

FIG. 3 shows an example of a name card to be processed in which character information about the name of a company, the user name for the name card, the department of assignment, the address of the company and a telephone number are arranged in a predetermined layout.

Returning to FIG. 2, the image data of the name card generated at the ST1 are fetched into the controller 1 and are then given to the display section 6 and are displayed thereon at ST2. The data to be displayed do not need to be images obtained at the reading process executed by the name card reading section 3 but may be images imitating the arrangement pattern of information of the name card.

Next, the operator photographs a customer's face by using the image pick-up section 2 (ST3). At ST4, the image of the face obtained by the photographing is displayed in a predetermined position on the display screen of the display section 6.

At ST5, the operator moves the image of the face into the image display region of the name card by using the input section 5, and furthermore, adjusts the position and size of the image of the face such that the image of the face enters the blank space region of the name card. Thus, the process of allocating the image of the face into the blank space is completed.

Then, when the operator carries out a predetermined printing start operation, the coating section 8 and the printing section 7 are operated so that the name cards set in the inlet port for the name card are sequentially delivered into the delivery path, the coating process and the process of printing the image of the face are carried out in order and the name cards are thus delivered to the predetermined position at ST6 and ST7.

The controller 1 executes a process of counting the number of the name cards to be printed every time one name card is delivered (ST8). When the count number reaches the input print number, the decision of ST9 is "YES". At ST10, then, the controller 1 operates the alarm buzzer 10 and gives the operator a notice that the printing process is completed. At ST11, the controller 1 calculates a price corresponding to the number of the printed name cards which is obtained by the counting process executed at the ST8, and furthermore, operates the slip issuing section 9 to issue a receipt having the face value of the calculated price printed thereon.

In the case of deferred payment, the bill is issued in place of the receipt.

FIG. 4 shows an example in which the name card of FIG. 3 is subjected to the process. The image of the face is allocated to a blank space region on the upper right of the name card and is then printed, resulting in the creation of a name card having a face photograph printed in the blank space region to be allocated.

Thus, the face photograph can easily be printed in the blank space region of the existent name card. Therefore, a name card useful for business can be created inexpensively. In addition, it is not necessary to dispose of the used name cards. Therefore, this method is very economical.

Figure 5:
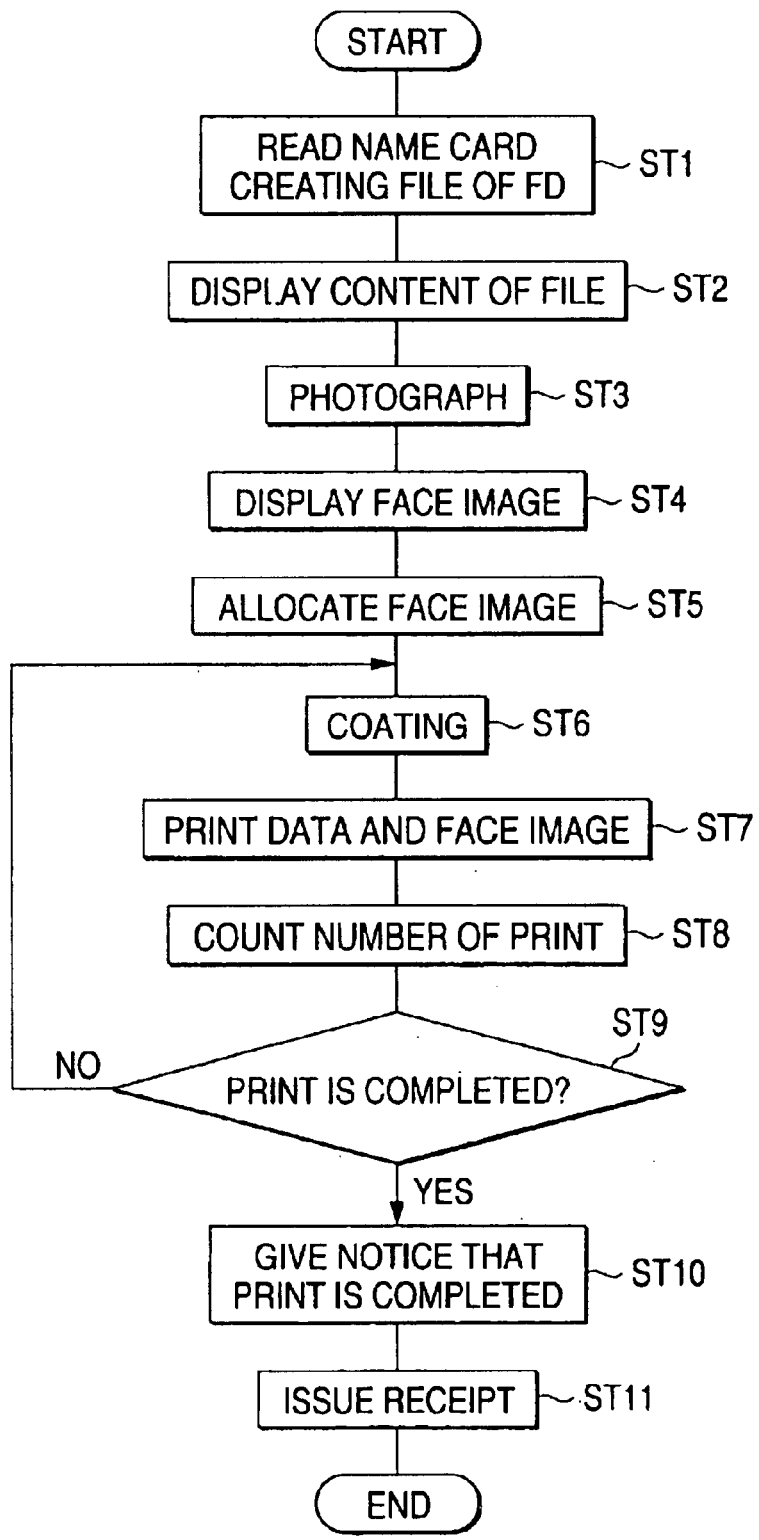
FIG. 5 is a flow chart showing the procedure for creating a name card having a face photograph by using a name card creating file.

FIG. 5 shows the procedure for creating a name card which is executed using a document read from the FD drive 4.

A floppy disk used in the present embodiment is purchased in advance from a service dealer by the customer. The purchased floppy disk stores a model file indicative of the basic layout of the name card which is set by the service dealer. The customer inputs fixed data such as the name of a company, an address and a name to the model file and appropriately modifies the layout, thereby creating the name card creating file.

In the present embodiment, a predetermined number of plain papers to be the base material of the name card are set to the inlet port for the name card. The operator sets the print number in the same manner as that in the embodiment of FIG. 2 and then sets up the floppy disk brought by the customer to the FD drive 4 and executes the reading operation. Consequently, the FD drive 4 is operated so that the name card creating file in the floppy disk is read and each information in the same file is displayed in a layout on the display section 6 (ST1 and ST2).

Also in this case, it is not necessary to display the detailed contents of the information but it is possible to 1L display an image imitating the arrangement pattern of the information on the name card.

When the layout display is thus carried out, the operator executes a modifying work if necessary and the face of the customer is then photographed and an image obtained by the photographing is allocated to a predetermined blank space region in the layout in the same manner as that in the embodiment of FIG. 2 (ST4 and ST5). Thereafter, the papers are supplied to the delivery path one by one according to a predetermined printing operation and is transferred to the printing section 7 through the process of the coating section 8. In the printing section 7, the data and the face image in the name card creating file are printed in positions corresponding to the layout on the supplied paper, respectively.

Thus, the image obtained by photographing the face is added to the document file information created by the customer and is then printed so that a name card having a photograph is created. It is possible to reduce the creating cost still more than that in the case in which a dealer is entrusted to perform the work for inputting information and the work for allocating a layout. In addition, the customer can create the name card creating file by simply inputting the fixed data to the model file. Therefore, there is no fear that a great deal of labor might be taken for allocating the layout or creating the document file. Moreover, it is also possible to change the layout of the model if necessary. Consequently, an original layout for a name card can be obtained by a simple edit operation.

The model file does not need to be stored in the floppy disk but the customer may freely download the model file from a communication system such as internet and may bring the same to the service dealer. Moreover, the number of service users can be increased by making the model file editable through a general-purpose word processor software or a text calculating software.

According to the procedures shown in FIGS. 2 and 5, thus, it is possible to easily create the name card having a face photograph in a short time. Furthermore, the print number can also be set freely. Therefore, customers who do not need a large number of name cards can readily utilize the procedure. In the embodiment shown in FIG. 2, particularly, the face photograph can be added to the blank space of the existent name card. Therefore, it is possible to change a part of a name card distributed from a company into a name card having a face photograph if necessary.

With the structure shown in FIG. 1, a digital camera is connected to the controller 1 to pick-up the image of the customer's face during the creation of a name card. A digital camera having a photograph may be brought in advance by the customer and may be connected to the controller 1 to create a name card by using an image retained therein. In addition to the image obtained by the digital camera, a face photograph taken in advance by an ordinary camera may be read into an image scanner to generate an image for printing. By these methods, a name card user himself (herself) can create a name card without going to the service dealer. Therefore, it is also possible to give an order for the name cards of employees from a person in charge of the company to the dealer.

Moreover, when the name card creator is introduced into a division in charge of creating name cards in the company, it is possible to considerably enhance the working efficiency for the creation of the name cards if a person himself (herself) inputs fixed data which could be easily mistaken. For example, the person can input his or her full name through the application of the second embodiment.

Furthermore, while the face photograph is printed in each of the embodiments, it is possible to print various images such as an illustration, for example, a portrait, a logo for a company and the photograph of a product to be advertised. In the case in which an image to be printed is generated by an image scanner, it is preferable that the image scanner to be used for the name card reading section 3 should be utilized. Therefore, it is possible to apply the same structure of the apparatus as that in FIG. 1.

In the coating process, a transparent coating layer may be formed over the surface of a name card or a paper having the same size as that of the name card. In particular, in the case in which a face photograph is to be printed on an existent name card, it is preferable that the coating should be applied to only the print region of the face photograph. Therefore, a coating object may be restricted to only a photograph printing region. The material and color of the paper to be a base material for a name card is varied depending on the companies. If a white coating layer is to be formed, the degree of coloring and picture quality of the photograph obtained by the printing can be enhanced so that a vivid photograph can be obtained.

As described above, the print position of an image and the size of the image to be printed are varied depending on the allocating process executed by the operator. For example, if the width of a film for the coating process is set to be extremely small and the name card is mounted on an XY table and is then moved slightly such that the film for the coating abuts on only the allocated blank space region, the coating can be applied to only the printing object region of a photograph.

While the name card issuing device shown in FIG. 1 is of such a type as to be operated by a service provider, that is, a dealer, the invention is not restricted thereto but can also be applied to an apparatus of a self-service type which is to be operated by a customer himself (herself).

Figure 6:
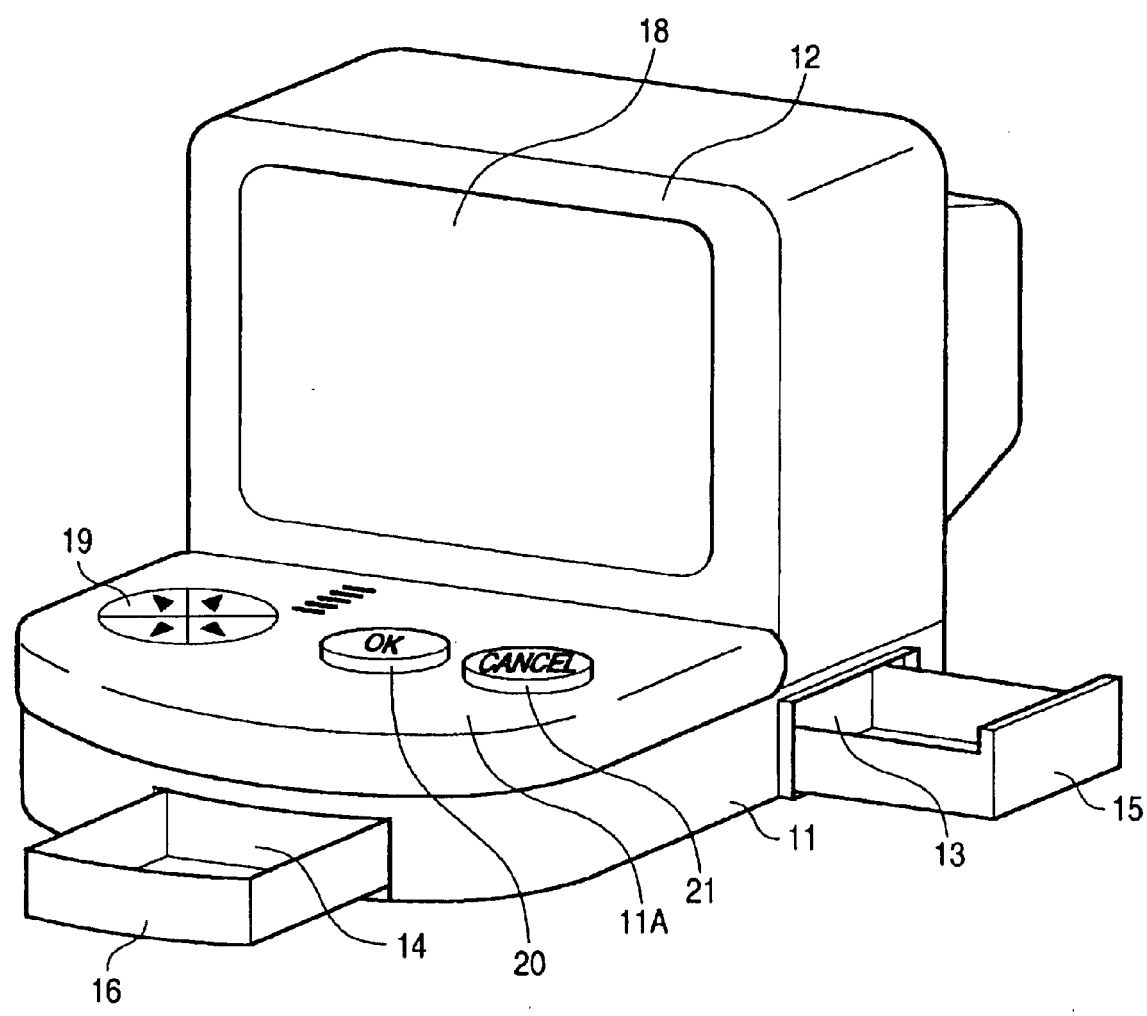
FIG. 6 is a perspective view showing the appearance of a name card creator of a self-service type.
Figure 7:
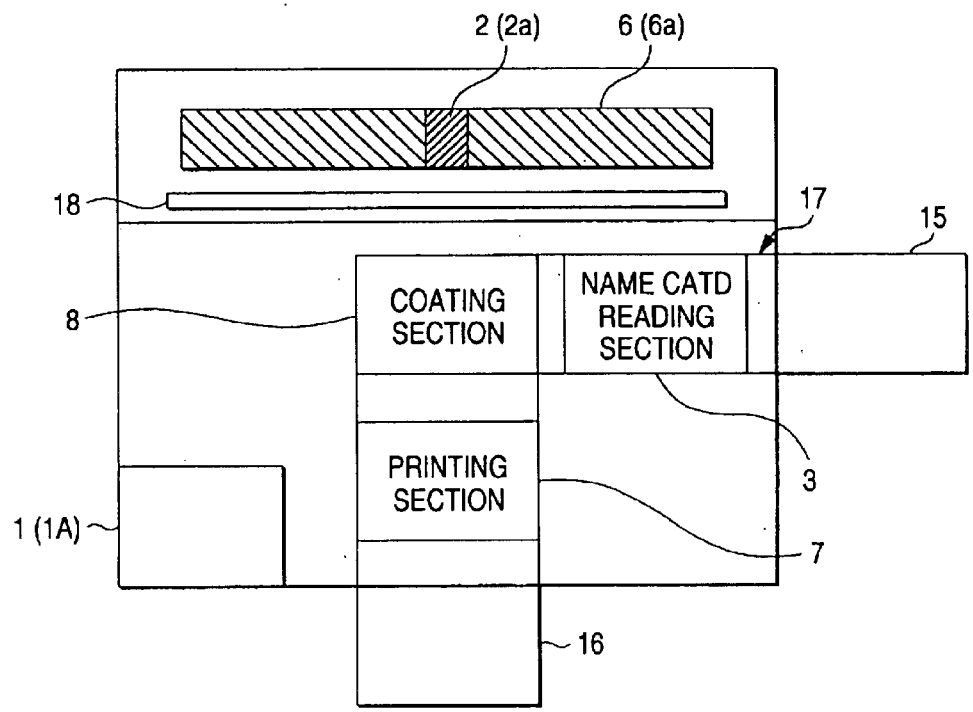
FIG. 7 is a diagram schematically illustrating the internal structure of the apparatus in FIG. 6 seen from a top surface.
Figure 8:
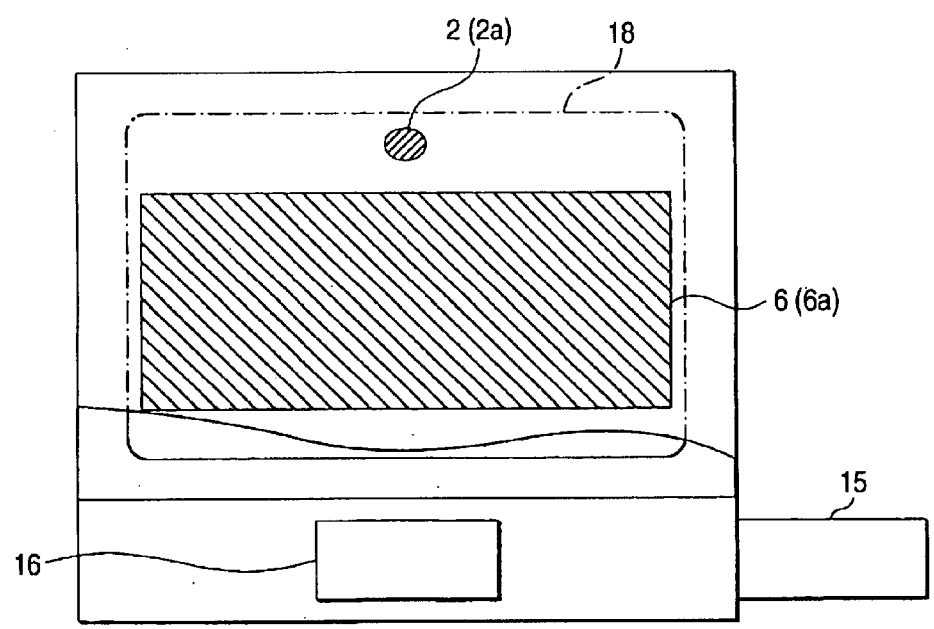
FIG. 8 is a diagram schematically illustrating the internal structure of the apparatus in FIG. 6 seen from a front part.

FIG. 6 shows the appearance of the name card issuing device of the self-service type. FIGS. 7 and 8 show the internal structure of the name card issuing device, FIG. 7 typically showing the schematic structure of the inside of the apparatus seen from the top side and FIG. 8 typically showing the schematic structure of the inside of the apparatus seen from the front part.

The name card issuing device according to the present embodiment is fabricated specially for the process of printing a face photograph on an existent name card, and each structure excluding the FD drive 4 and the slip issuing section 9 shown in FIG. 1 is incorporated into the inside and outside of the apparatus body in which a display unit 12 is connected integrally with a hollow body section 11.

The body section 11 takes such a shape as to be projected forward from the display screen of the display unit 12 and has an operation surface 11A formed on the top of the projected portion. Moreover, an inlet port 13 for a name card is formed on one of side surfaces of the body section 11 and a discharge port 14 for the name card is formed on the front part, and name card holders 15 and 16 are fixed to the outside of the ports 13 and 14, respectively.

A sensor (not shown) for detecting the presence of the name card in the holder 15 is provided in the inlet port 13 for the name card.

An L-shaped delivery path 17 communicating with the inlet port 13 and the discharge port 14 for the name card is formed in the body section 11. Furthermore, a name card reading section 3, a coating section 8 and a printing section 7 are provided on the delivery path 17, respectively. Moreover, a control substrate 1A constituting the controller 1 is provided in the predetermined position of the bottom surface of the body section 11.

A display screen having a half mirror 18 is formed on the front surface of the display unit 12, a display section 6 is provided in a central position behind the screen, and an image pick-up section 2 is provided above the display section 6.

The display section 6 has a monitor device 6a using a CRT or a liquid crystal, and displays, on a display screen thereof, a message screen indicative of the contents of an operation if necessary in addition to the image of a name card and a face image. The image pick-up section 2 is constituted by a digital camera 2a and has an optical axis provided obliquely downward corresponding to the position of a user's standard eye level. Since the user recognizes only light transmission from the inside of the apparatus body to the outside thereof through the half mirror 18, he (she) does not become aware of the presence of the camera 2a but turns a line of sight to the display screen of the monitor device 6a. In this state, the camera 2a is operated. Consequently, the user's face can be caught on the front surface and can be thus photographed.

The operation surface 11A has an arrow key 19 corresponding to four directions, a definition key 20 and a cancel key 21 which are provided as a structure equivalent to the input section 5. The arrow key 19 serves to move a face image and to enlarge and reduce a size thereof in the process of allocating the face image, and the definition key 20 is operated to give an instruction to start an image pick-up process and a printing process and to define a position where the face image is to be allocated. Moreover, the cancel key 21 is operated to reset the allocating position of the image and to stop the printing.

With the structure, when a name card creating process is started, a first name card is fetched through the inlet port 13 and is delivered into the name card reading section 3 so that a process of reading each printed information is carried out. The first name card is held in the name card reading section 3 until the printing process is started. When the printing is started, a first name card to be printed is delivered into the coating section 8 and the printing section 7 in order and is subjected to respective processes.

The name card reading section 3 does not execute a reading process but causes succeeding name cards to pass. The name cards are sequentially delivered into the coating section 8 and the printing section 7, are subjected to the same coating process and printing process as those in the first embodiment, and are then delivered to a holder through the discharge port 14.

In the present embodiment, furthermore, a blank space region where a face image can be printed is automatically retrieved from the image of the name card obtained through the reading process of the name card reading section 3 and initialization for putting the face image obtained by the camera 2a in that position is performed such that the user can easily carry out the process of allocating the face image. The user can complete the process of allocating the face image by simply performing modification after the initialization if necessary. Therefore, it is easy to carry out the allocating process in a short time.

Figure 9:
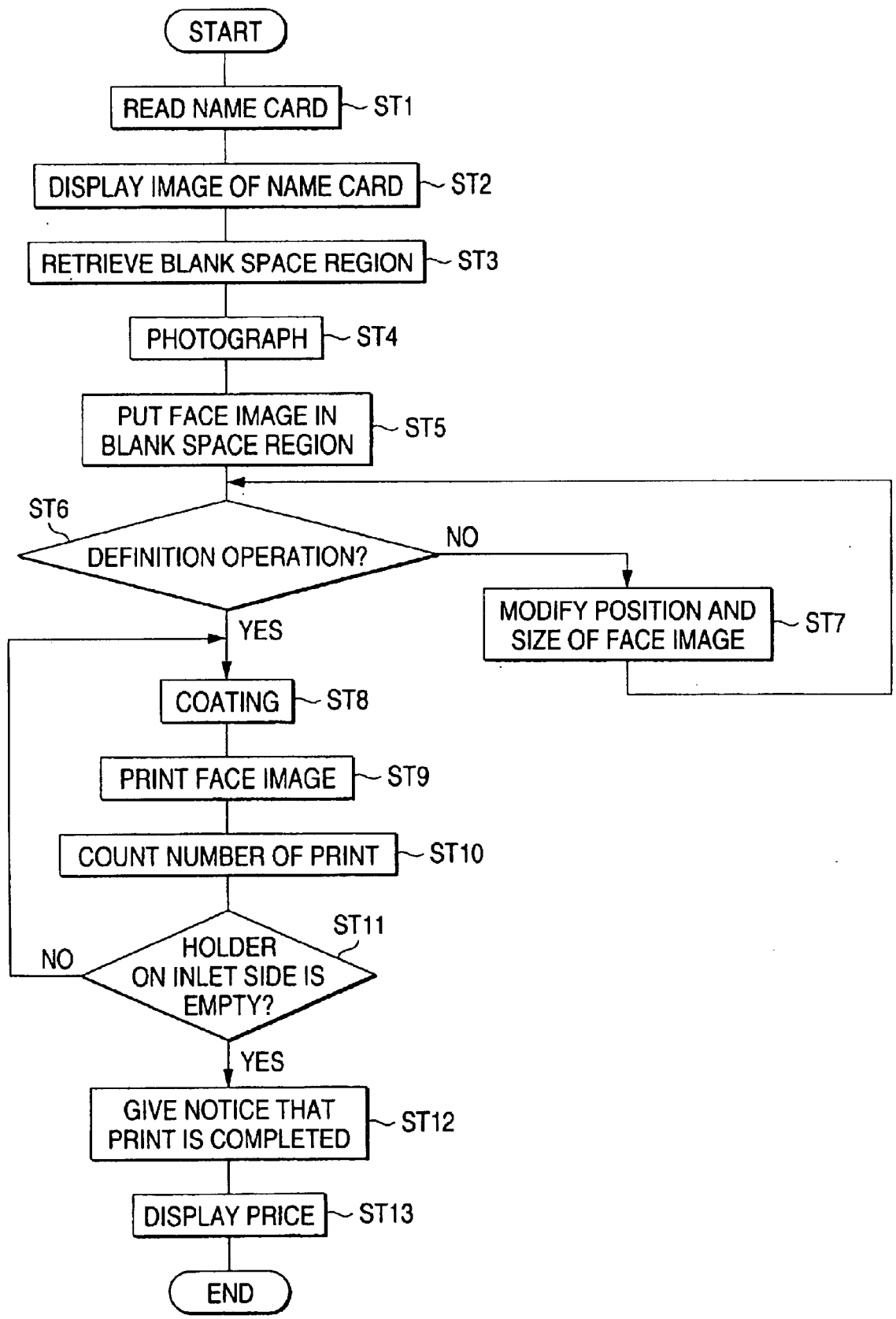
FIG. 9 is a flow chart showing the procedure for creating a name card having a face photograph based on an existent name card in the apparatus of FIG. 6.

FIG. 9 shows the procedure for creating a name card in the name card creator.

The user sets a predetermined number of name cards kept in stock to the holder 15 on the inlet port 13 side prior to the process. When a start operation such as the operation of the definition key 20 is carried out in this state, a first name card is fetched into the delivery path 17 and is delivered into the name card reading section 3 and a process of reading the printed information is carried out (ST1).

The controller 1 stores an image obtained by the reading process in an internal memory and displays the same image on the display section 6 (ST2). Furthermore, the controller 1 checks the luminance of each composite pixel in the memory and retrieves the pixel constituting a blank space portion where a character is not printed. Based on the result of the retrieval, a blank space region having an area equal to or greater than a predetermined value is extracted and the position of the extraction is held as a candidate for the print region of the face image in the memory (ST3).

Then, when the face image is acquired through a photographing process at ST4, the controller 1 puts and displays the acquired face image in the blank space region extracted at the ST3 in the image of the name card on the display screen.

Referring to the display, the user can freely modify the position and size of the face image by the operation of the arrow key 19. When the user carries out modification to be required and then operates the definition key 20 at ST6 and ST7, a position where the face image is provided is defined as a position where the face image is to be allocated.

When the allocating position of the face image is defined, the name cards in the holder 15 are fetched in order so that the coating process and the process of printing the face image are executed by the coating section 8 and the printing section 7 respectively and the process of counting the print number is carried out (ST8 to ST10). When it is detected that the holder 15 is empty by a sensor on the inlet port 13 side, the routine proceeds from ST11 to ST12 where a notice that the printing is completed is given by the alarm buzzer.

At ST13, furthermore, the price required for creating the name card is calculated depending on the count result of the number of the name cards to be printed, and is displayed on a monitor screen. The user confirms the display, completes payment and takes the printed name cards.

In the case in which the process to be carried out till the payment is automated, it is preferable that the slip issuing section 9 shown in FIG. 1 and a processing mechanism for money should be incorporated into the structures of FIGS. 8 and 9, the print number should be input before the creation of the name card and the payment should be carried out in advance. The controller 1 sets each portion to be active depending on the payment and then executes the same processes as those at the ST1 to ST7 in FIG. 10. When the process of allocating a face image is completed, the input number of name cards is printed and a receipt is issued from the slip issuing section 9 after the printing is completed. Thus, the process is completed.

While an image obtained by the camera or the image scanner is allocated to the blank space region of the name card and is then printed in each of the embodiments, the image to be allocated to the name card is not restricted but the controller 1 may have a plotting function and an image generated by the plotting operation of the operator (or the user himself (herself) may be allocated to the blank space region of the name card and be printed. Moreover, it is also possible to fetch an image created by another apparatus through a recording medium such as a floppy disk or communication.

By such a method, an image such as a portrait or a mark can freely be created. Therefore, it is possible to create a name card having a high originality. In particular, it is possible to provide an apparatus suitable for the user creating a name card for the purpose of hobbies.

On the other hand, in the case in which the existent name card is utilized, it is not necessary to always allocate an image to a blank space region and it is also possible to fetch and allocate character information from the input section 5. For example, according to this method, in the case in which the untitled person is promoted, a title and an address for an electronic mail can be added. By effectively utilizing the used name card, the cost can be reduced and a practical apparatus suitable for companies can be provided.

In addition, in the case in which a part of information such as the name of a department or a telephone number is to be modified, it is rarely necessary to discard the existent name card and print a new name card by printing new information after the plain coating process is carried out. Consequently, a cost required for creating a name card can be reduced considerably.

According to the first aspect of the invention, in the case in which there is the information to be newly added to the existent name card, the additional information can be printed in the blank space of the name card. Therefore, it is not necessary to print a name card again. Accordingly, a cost required for the creation of the name card can be reduced considerably, and old name cards do not need to be discarded, resulting in a contribution to a reduction in the cost.

According to the second aspect of the invention, an image can be printed in the blank space of the existent name card. Therefore, it is possible to inexpensively change a name card having only character information into a new name card with a great impact which has an image such as a face photograph or a logo.

According to the third aspect of the invention, it is possible to carry out and file the processes of inputting the basic information to be described on the name card, for example, a name, the name of a company, an address or a telephone number, and of allocating this information on the user side, and to add an image to the information of the data file and to print the same image. Therefore, it is possible to omit the labor of the service provider, which is required for creating a name card having an image such as a face photograph, resulting in a reduction in manufacturing costs. Moreover, if the basic information is set based on a predetermined model layout, much labor is not required for creating information on the user side.

According to the fourth aspect of the invention, it is easy to create a name card having a face photograph inexpensively.

According to the fifth aspect of the invention, it is possible to easily acquire an image to be put on a name card in addition to the basic information, for example, the face or portrait of a person or the logo of a company which is described on the name card through a camera or an image scanner.

According to the sixth aspect of the invention, an image to be provided on the blank space of the name card can be created freely through the plotting operation. Therefore, it is possible to create a name card having a high originality.

According to the seventh aspect of the invention, the predetermined coating process is carried out on the print surface prior to the image printing. Therefore, it is possible to stabilize the quality of coloring and to carry out printing without a blot or a blur irrespective of the state of the print surface.

According to the eighth aspect of the invention, the notifying means gives a notice that the printing process is completed. Therefore, in the case in which a large number of name cards are to be printed, the completion of the name card can be grasped easily.

According to the ninth aspect of the invention, in the case in which the name card creating service is to be carried out, the amount of money corresponding to the number of the printed name cards is automatically calculated and a slip such as a bill or a receipt is issued. Therefore, an accounting process can be automated.

What is claimed is:

1. A name card creating apparatus comprising:
    fetching means for fetching layout information previously printed on a name card;
    display means for displaying the layout information previously printed on the name card fetched by said fetching means;
    input means for inputting additional information;
    information allocating means for allocating the additional information, input through the input means, to a predetermined blank space region in the layout, depending on an external allocating operation for the layout displayed on said display means; and printing means for sequentially executing a process of printing the additional information in the blank space region allocated by the information allocating means for a predetermined number of name cards having information printed based on the layout.

2. The name card creating apparatus according to claim 1, wherein said fetching means fetches the name card having information printed thereon and reads the layout thereof.

3. The name card creating apparatus according to claim 1, wherein the additional information is an image, said input means is image acquiring means, and said information allocating means allocates the image acquired by said image acquiring means to the predetermined blank space region.

4. The name card creating apparatus according to claim 1, wherein said fetching means externally fetches a data file storing a plurality of information to be described on the name card and information related to the layout for printing the plurality of information on paper having the same size as that of the name card.

5. The name card creating apparatus according to claim 3, wherein the image acquired through said image acquiring means is an image for a face photograph.

6. The name card creating apparatus according to claim 3, wherein said image acquiring means comprises a camera or an image scanner.

7. The name card creating apparatus according to claim 3, wherein said image acquiring means serves to acquire an image created by a computer depending on a plotting operation.

8. The name card creating apparatus according to claim 1, further comprising coating means for carrying out a predetermined coating process on a print surface prior to the printing process to be executed by said printing means.

9. The name card creating apparatus according to claim 1, further comprising notifying means for giving a notice that the printing process of said printing means is completed.

10. The name card creating apparatus according to claim 1, further comprising: calculating means for calculating an amount of money corresponding to the number of name cards printed by said printing means; and slip issuing means for issuing a slip on which the amount of money calculated by said calculating means is described.

11. A name card creating apparatus, comprising:

a card reading section, disposed in said apparatus, said reading section reading existing information previously printed on cards;

a display section, disposed in said apparatus, displaying the existing information read by said card reading section;

an input section, disposed in said apparatus, receiving additional information for said cards having existing information; and an allocation section, disposed in said apparatus, allocating said additional information to an area of said card.

12. The name card creating apparatus of claim 11, further comprising a coating section.

13. The name card creating apparatus of claim 11, further comprising a printing section.

14. The name card creating apparatus of claim 11, wherein said input section is a camera.

15. The name card creating apparatus of claim 11, wherein said allocating section comprises at least one arrow key.

16. The name card creating apparatus of claim 11, wherein said display section comprises a display screen and an image pick-up section adjacent said display section.

17. The name card creating apparatus of claim 11, wherein said allocating section allocates said additional information to a blank area of said card.

18. A method for creating a name card, comprising:

reading information previously printed on a name card;

displaying said information previously printed on said name card;

inputting additional information to be displayed on said name card; and allocating said additional information to an area of said name card.

19. The method according to claim 18, further comprising coating said card.

20. The method according to claim 18, further comprising printing said additional information onto said card.

* * * * *